United States Patent
Kim

(10) Patent No.: US 12,179,290 B2
(45) Date of Patent: Dec. 31, 2024

(54) SYSTEM FOR DETECTING POOR WELD IN WELDED PORTION OF BATTERY MODULE, AND METHOD THEREOF

(71) Applicants: HYUNDAI MOTOR COMPANY, Seoul (KR); KIA CORPORATION, Seoul (KR)

(72) Inventor: Kyungmo Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 327 days.

(21) Appl. No.: 17/686,657

(22) Filed: Mar. 4, 2022

(65) Prior Publication Data

US 2023/0009074 A1   Jan. 12, 2023

(30) Foreign Application Priority Data

Jul. 7, 2021   (KR) .......................... 10-2021-0089090

(51) Int. Cl.
  *B23K 31/00*   (2006.01)
  *B23K 31/12*   (2006.01)
  *G01N 21/89*   (2006.01)
  *B23K 101/36*  (2006.01)

(52) U.S. Cl.
  CPC ....... *B23K 31/125* (2013.01); *G01N 21/8914* (2013.01); *B23K 2101/36* (2018.08); *G01N 2021/8918* (2013.01)

(58) Field of Classification Search
  CPC .......... B23K 31/125; G01N 2203/0296; G01B 5/30; H01M 10/4285
  See application file for complete search history.

(56) References Cited

U.S. PATENT DOCUMENTS

| | | | | |
|---|---|---|---|---|
| 2,959,051 | A * | 11/1960 | Simek | ...................... G01N 3/00 73/842 |
| 2022/0352592 | A1* | 11/2022 | Kim | ......................... G01B 5/30 |
| 2023/0009074 | A1* | 1/2023 | Kim | ....................... G01N 21/95 |

OTHER PUBLICATIONS

CN-210833329-U computer English Translation (Year: 2024).*

* cited by examiner

*Primary Examiner* — Erin B Saad
(74) *Attorney, Agent, or Firm* — MCDONNELL BOEHNEN HULBERT & BERGHOFF LLP

(57) ABSTRACT

Provided is a system for detecting a poor weld in a welded portion of a battery module, the system including a battery module fixation unit fixing the battery module to be inspected, an inspection position movement unit moving the battery module fixation unit to a welding inspection position, a welding inspection unit including a frictional reaction force measurement unit inducing a slight movement of the welded portion of the battery module and measuring a frictional reaction force generated thereby and a vision inspection camera detecting an amount of change in a position of the welded portion of the battery module, and a control unit determining whether the welded portion of the battery module is poorly welded based on the frictional reaction force and the amount of position change, measured by the welding inspection unit.

15 Claims, 15 Drawing Sheets

SYSTEM FOR DETECTING POOR WELD IN WELDED PORTION OF BATTERY MODULE, AND METHOD THEREOF

CROSS-REFERENCE TO RELATED APPLICATION

This application claims priority to and the benefit of Korean Patent Application No. 10-2021-0089090 filed in the Korean Intellectual Property Office on Jul. 7, 2021, the entire contents of which are incorporated herein by reference.

BACKGROUND

(a) Field

The present disclosure relates to a system for detecting a poor weld in a welded portion of a battery module and a method thereof, and more particularly, to a system for detecting a poor weld in a welded portion of a battery module, the system being capable of preventing any human error and inspection omission by performing an automated welding inspection on the welded portion of the battery module, and a method thereof.

(b) Description of the Related Art

In general, a battery pack for an eco-friendly vehicle may be made in such a manner that a plurality of battery cells (or cell pouches) are assembled to each other to make a battery module, and the plurality of battery modules are then assembled to each other to finally have a form of the battery pack mounted in a vehicle.

This type of battery module may have a required capacity by stacking, bonding and assembling a predetermined number of the cell pouches to each other. Here, laser welding and welding inspection processes may be performed for the cell pouches to be electrically connected to each other. The laser welding process may be performed for a lead of the battery cell and a module bus bar to overlap each other, and the welding inspection process may then be performed to guarantee quality of the welding.

The conventional welding inspection process is mainly conducted as human visual inspection and machine vision inspection to inspect an exterior of the battery cell such as the length, width, penetration or the like of its weld bead.

However, it is only possible to check the length, width, and penetration of the weld bead by the conventional human visual inspection and machine vision inspection. It is impossible to detect a welding defect occurring in a base material, such as a gap between the base materials, insufficient depth, excessive internal pores or the like by the conventional human visual inspection and machine vision inspection methods.

In addition, each of the conventional human visual inspection and machine vision inspection is a manual inspection performed by a worker. However, each worker has a different technical skill in the inspection process, thereby lowering reliability of the inspection when repeated. The worker may make an error such as inspection omission, and a labor cost may be increased due to such a manual process.

The above information disclosed in this Background section is only for enhancement of understanding of the background of the disclosure, and therefore it may contain information that does not form the prior art that is already known in this country to a person of ordinary skill in the art.

SUMMARY

An exemplary embodiment of the present disclosure provides a system for detecting a poor weld in a welded portion of a battery module, the system using automated welding inspection capable of determining a defect, by slightly moving a lead of the battery cell in the battery module to detect a change in its position by vision and to detect its frictional reaction force.

According to an exemplary embodiment of the present disclosure, a system for detecting a poor weld in a welded portion of a battery module includes: a battery module fixation unit fixing the battery module to be inspected; an inspection position movement unit moving the battery module fixation unit to a welding inspection position, a welding inspection unit including a frictional reaction force measurement unit inducing a slight movement of the welded portion of the battery module and measuring a frictional reaction force generated thereby, and a vision inspection camera detecting an amount of change in a position of the welded portion of the battery module; and a control unit determining whether the welded portion of the battery module is poorly welded based on the frictional reaction force and the amount of position change, measured by the welding inspection unit.

The welding inspection unit may be positioned on a movable servo plate, and the servo plate may be coupled to a rail to be advanced and retreated toward the welded portion of the battery module moved to the inspection position.

The frictional reaction force measurement unit may include a base, a slight movement unit disposed on the base, and slightly moved by coming into contact with a lead of the welded portion of the battery module, a frictional reaction force measurement load cell supporting both sides of the slight movement unit, and measuring the frictional reaction force induced by the movement of the slight movement unit, and a slight movement induction servo device supporting the base and inducing the slight movement unit to be slightly moved at a specific position of the welded portion of the battery module. The frictional reaction force measurement load cell and the vision inspection camera may respectively transmit a signal of the frictional reaction force and a signal of the amount of position change to the control unit through a signal transmission wire.

A portion of the slight movement unit, in contact with the welded portion of the battery module, may have a wedge and a protrusion to generate a friction force between the portion itself and a surface of the lead of the welded portion of the battery module.

The slight movement unit may be disposed on an inspection assembly supporting the base, and the inspection assembly may be ball-bearing coupled to a rail positioned on the slight movement induction servo device.

The control unit may determine that the welded portion of the battery module is poorly welded when an amount of change in a position of the lead, detected by the vision inspection camera, is 10% or more of an amount of the induced slight movement of the battery module in a direction in which the battery cells are stacked.

The slight movement induction servo device may be operated for the slight movement unit to be moved about 1 mm in one direction in which the battery cells of the battery module are stacked and then maintained for about one second, and then moved about 1 mm in the other direction and then maintained for about one second.

The control unit may determine that the welded portion of the battery module is poorly welded when the amount of change in the position of the lead of the battery module, detected by the vision inspection camera, is 0.1 mm or more in the direction in which the battery cells of the battery module are stacked.

The control unit may determine that the welded portion of the battery module is poorly welded when the frictional reaction force measured by the frictional reaction force measurement load cell is less than 40% of the tensile strength generated by normal welding.

According to another exemplary embodiment of the present disclosure, a method of detecting a poor weld in a welded portion of a battery module, in which the method uses the system of claim 1 for detecting a poor weld in a welded portion of a battery module, which is to inspect a welded state of the battery module made by assembling a plurality of battery cells to each other, includes: seating and fixing the battery module on a battery module fixation unit, moving the battery module fixed on the battery module fixation unit to a position where the welded portion of the battery module faces a welding inspection unit, moving the welding inspection unit toward the welded portion of the battery module for a frictional reaction force measurement unit to come into contact with the welded portion of the battery module, and determining whether the welded portion of the battery module is poorly welded through the welding inspection unit, by a control unit.

In the determining of whether the welded portion of the battery module is poorly welded, the frictional reaction force measurement unit may be slightly moved to detect a frictional reaction force generated by an induced slight movement of the battery module.

The welded portion of the battery module may be determined to be poorly welded when the frictional reaction force is less than 40% of the tensile strength generated by normal welding.

The determining of whether the welded portion of the battery module is poorly welded may be made based on an amount of change in a position of a lead of the battery module, detected by a vision inspection camera.

The welded portion of the battery module may be determined to be poorly welded when the amount of change in the position of the lead of the battery module is 10% or more of an amount of the induced slight movement of the battery module in a direction in which the battery cells are stacked.

As set forth above, according to the present disclosure, it is possible to prevent human error and the inspection omission by performing the automated welding inspection on the welded portion of the battery module, thereby reducing the labor cost.

In addition, according to the present disclosure, it is possible to prevent any damage to the welded portion and adhesion of a foreign material to a flip stick, that may occur when performing the inspection by using the conventional flip stick.

In addition, according to the present disclosure, it is possible to improve welding quality by detecting the poor weld such as non-welding or weak welding, by performing the vision inspection on the shape of the welded bead and by detecting the slight movement of the battery module.

DETAILED DESCRIPTION

Figure 1:
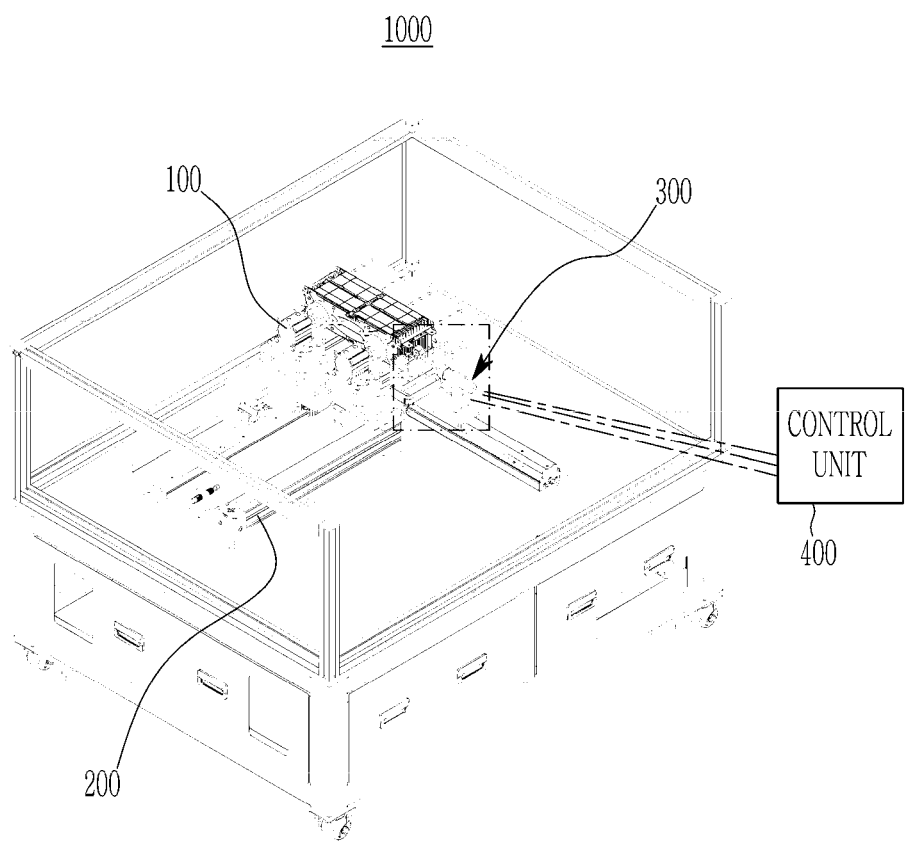
FIG. 1 is a view showing a system for detecting a poor weld in a welded portion of a battery module according to an exemplary embodiment of the present disclosure.

Hereinafter, exemplary embodiments of the present disclosure will be described in detail with reference to the accompanying drawings so that those skilled in the art to which the present disclosure pertains may easily practice the present disclosure. The present disclosure will be described more fully hereinafter with reference to the accompanying drawings, in which exemplary embodiments of the present disclosure are shown.

The present disclosure may be modified in various different forms, and is not limited to embodiments provided in the present specification.

In addition, in several exemplary embodiments, components having the same configuration will be representatively described using the same reference numerals in an exemplary embodiment, and only components different from those of an exemplary embodiment will be described in the other exemplary embodiments.

It should be understood that the drawings are schematic and not drawn to scale.

The size and proportion of a component in the drawings are shown relatively exaggerated or reduced in size in order to clearly and easily explain the drawings. This arbitrary size is only illustrative and not limiting.

In addition, the same reference numeral may be used to denote a similar feature of the same structure, element or part shown in two or more drawings.

When an element is referred to as being "on" or "above" another element, it is to be understood that the element may be directly "on" another element or "above" another element including other elements therebetween.

An exemplary embodiment of the present disclosure may specifically describe one embodiment of the present disclosure.

As a result, diagrams may be variously modified.

Accordingly, the exemplary embodiment is not limited to a specific shape of the illustrated portion, and may include, for example, a shape modified when produced.

Hereinafter, a system for detecting a poor weld in a welded portion of a battery module according to an exemplary embodiment of the present disclosure is described with reference to FIGS. 1 to 3.

FIG. 1 is a view showing the system for detecting a poor weld in a welded portion of a battery module according to an exemplary embodiment of the present disclosure. FIG. 2 is a view showing that a welding inspection unit, included in the system for detecting a poor weld in a welded portion of a battery module according to an exemplary embodiment of the present disclosure, is disposed to inspect the welded portion of the battery module. FIG. 3 is a view showing the welding inspection unit included in the system for detecting a poor weld in a welded portion of a battery module according to an exemplary embodiment of the present disclosure.

Referring to FIG. 1, a system 1000 for detecting a poor weld in a welded portion of a battery module according to an exemplary embodiment of the present disclosure is to inspect a welded state of a battery module 10 made by assembling a plurality of battery cells to each other, and includes: a battery module fixation unit 100, the inspection position movement unit 200, a welding inspection unit 300 and a control unit 400.

The battery module 10 may include a cell stack including the plurality of stacked battery cells, and a sensing block equipped with a bus bar electrically connected to respective leads of the plurality of battery cells to sense their voltage information.

The battery cell may include a negative electrode plate and a positive electrode plate, and a separator interposed between the negative electrode plate and the positive electrode plate.

A negative lead may be positioned on the negative electrode plate, and a positive lead positioned on the positive electrode plate.

The battery cell may have a structure in which the negative electrode plate, the separator and the positive electrode plate are sequentially stacked and surrounded by a cell pouch.

Here, the negative lead and the positive lead may be exposed to the outside of the cell pouch.

In addition, a fixing plate may be disposed on each of two sides of the cell stack, made by overlapping the plurality of battery cells, in the width direction.

The battery module fixation unit 100 may fix the fixing plate disposed on each of the two sides of the battery module 10 which is to be inspected.

The battery module fixation unit 100 may include a plate on which the battery module 10 may be seated, and a plurality of support members by which the fixing plate of the battery module 10 may be supported on the plate.

The inspection position movement unit 200 may move the battery module fixation unit 100 to a welding inspection position.

To this end, the inspection position movement unit 200 may be positioned to support the bottom of the battery module fixation unit 100 and to be moved along rails positioned in a direction in which the battery cells of the battery module 10 are stacked.

The welding inspection unit 300 may perform a welding inspection on a welded portion 12 of a cross section of the battery cell of the battery module 10 moved to the inspection position by the inspection position movement unit 200.

To this end, the welding inspection unit 300 may include a frictional reaction force measurement unit 310 and a vision inspection camera 320.

The welding inspection unit 300 may induce the welded portion 12 of the battery module 10 to be slightly moved, and the frictional reaction force measurement unit 310 may come into contact with the welded portion 12 of the battery module 10 to measure a frictional reaction force generated by this slight movement.

In addition, the vision inspection camera 320 may detect an amount of change in a position of the welded portion 12 of the battery module 10, caused by the slight movement.

The control unit 400 may determine whether the welded portion 12 of the battery module 10 is poorly welded based on the frictional reaction force and the amount of position change, respectively measured by the frictional reaction force measurement unit 310 and the vision inspection camera 320 of the welding inspection unit 300.

Figure 2:
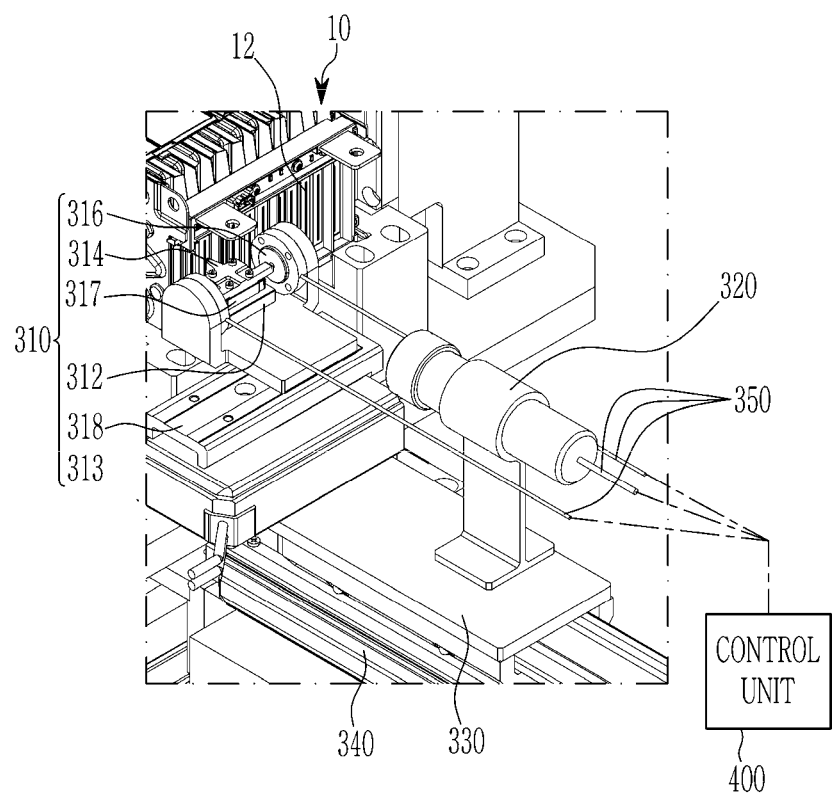
FIG. 2 is a view showing that a welding inspection unit, included in the system for detecting a poor weld in a welded portion of a battery module according to an exemplary embodiment of the present disclosure, is disposed to inspect the welded portion of the battery module.
Figure 3:
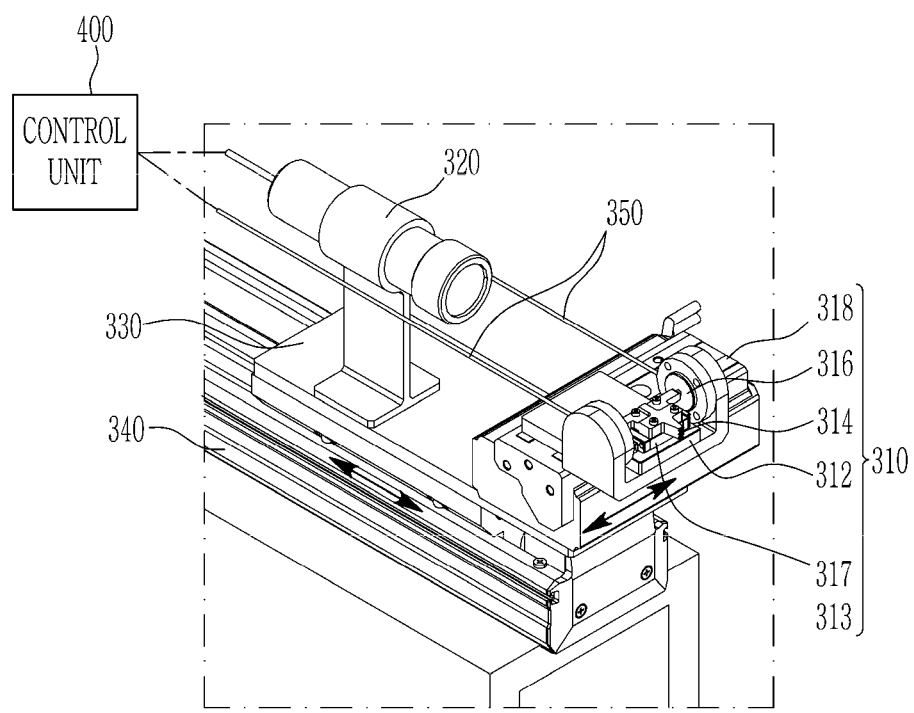
FIG. 3 is a view showing the welding inspection unit included in the system for detecting a poor weld in a welded portion of a battery module according to an exemplary embodiment of the present disclosure.

Referring to FIGS. 2 and 3, the welding inspection unit 300 may be positioned on a servo plate 330 movable in the direction in which the battery cells are stacked, and the servo plate 330 may be moved along a rail 340 extending in a direction perpendicular to the direction in which the battery cells are stacked, and may thus be advanced and retreated toward the welded portion 12 of the battery module 10 moved to the inspection position.

As the servo plate 330 is moved, the frictional reaction force measurement unit 310 and the vision inspection camera 320 may also be moved.

The frictional reaction force measurement unit 310 may include a base 317, a slight movement unit 314, a frictional reaction force measurement load cell 316 and a slight movement induction servo device 318.

The slight movement unit 314 may be disposed on the base 317, and may be slightly moved by coming into direct contact with a lead 13 of the welded portion 12 of the battery module 10.

The frictional reaction force measurement load cell 316 may support and fix both sides of the slight movement unit 314, and may measure the frictional reaction force induced by the movement of the slight movement unit 314.

The slight movement induction servo device 318 may support the base 317, and may induce the slight movement unit 314 to be slightly moved at a specific position of the welded portion 12 of the battery module 10.

The base 317 may be supported by an inspection assembly 312.

That is, the inspection assembly 312 may be interposed between the slight movement induction servo device 318 and the base 317.

The frictional reaction force measurement load cell 316 may be positioned on each of two sides of the inspection assembly 312.

The slight movement induction servo device 318 may slightly move the inspection assembly 312, thereby allowing the base 317 and the slight movement unit 314, supported on the inspection assembly 312, to be slightly moved.

The frictional reaction force measurement load cell 316 and the vision inspection camera 320 may respectively transmit a signal of the frictional reaction force and a signal of the amount of position change to the control unit 400 through a signal transmission wire 350.

Figure 4:
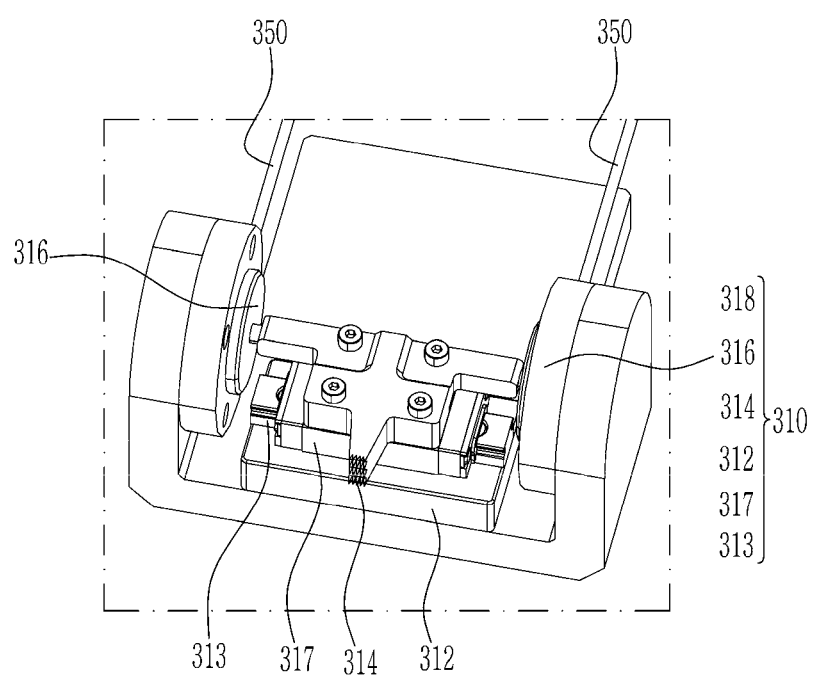
FIG. 4 is a view showing a frictional reaction force measurement unit included in the system for detecting a poor weld in a welded portion of a battery module according to an exemplary embodiment of the present disclosure.

FIG. 4 is a view showing a frictional reaction force measurement unit included in the system for detecting a poor weld in a welded portion of a battery module according to an exemplary embodiment of the present disclosure.

Referring to FIG. 4, an end portion of the slight movement unit 314, i.e., its portion in contact with the welded portion 12 of the battery module 10, may protrude toward the welded portion 12 of the battery module 10 and have a plurality of wedges.

The end portion of the slight movement unit 314 may come into contact with the lead 13 of the welded portion 12 of the battery module 10 and generate a friction force between the portion itself and a surface of the lead 13.

Meanwhile, the inspection assembly 312 may be ball-bearing coupled to a rail 313 positioned on the slight movement induction servo device 318 and may be moved left and right in the direction in which the battery cells are stacked.

Figure 5:
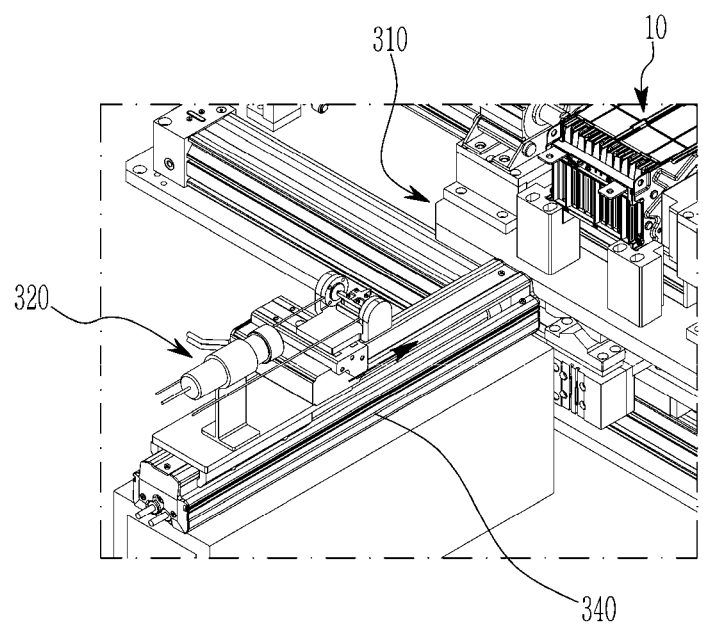
FIG. 5 is a view showing that the welding inspection unit, included in the system for detecting a poor weld in a welded portion of a battery module according to an exemplary embodiment of the present disclosure, is ready to inspect the welded portion of the battery module.

FIG. 5 is a view showing that the welding inspection unit, included in the system for detecting a poor weld in a welded portion of a battery module according to an exemplary embodiment of the present disclosure, is ready to inspect the welded portion of the battery module, and FIGS. 6A to 6D are views each showing that the frictional reaction force measurement unit, included in the system for detecting a poor weld in a welded portion of a battery module according to an exemplary embodiment of the present disclosure, is in contact with the welded portion of the battery module to inspect the welded portion of the battery module.

Figure 6A:
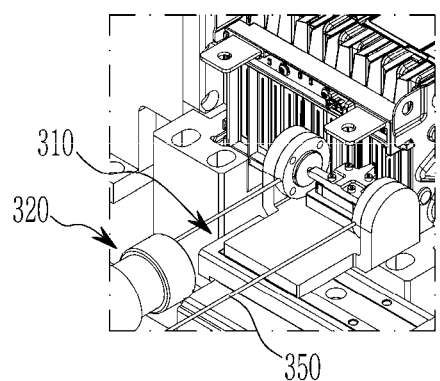
FIG. 6A is a view showing that the frictional reaction force measurement unit, included in the system for detecting a poor weld in a welded portion of a battery module according to an exemplary embodiment of the present disclosure, is in contact with the welded portion of the battery module to inspect the welded portion of the battery module.
Figure 6B:
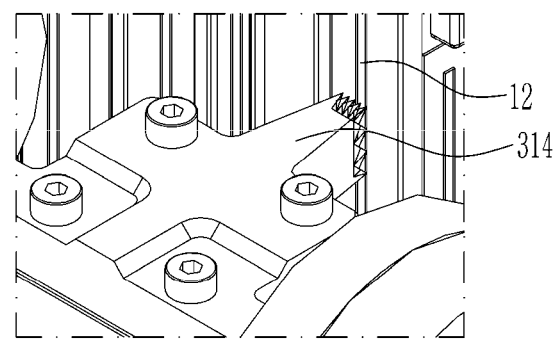
FIG. 6B is a view showing that the frictional reaction force measurement unit, included in the system for detecting a poor weld in a welded portion of a battery module according to an exemplary embodiment of the present disclosure, is in contact with the welded portion of the battery module to inspect the welded portion of the battery module.
Figure 6C:
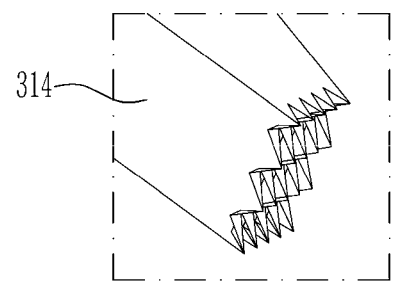
FIG. 6C is a view showing that the frictional reaction force measurement unit, included in the system for detecting a poor weld in a welded portion of a battery module according to an exemplary embodiment of the present disclosure, is in contact with the welded portion of the battery module to inspect the welded portion of the battery module.
Figure 6D:
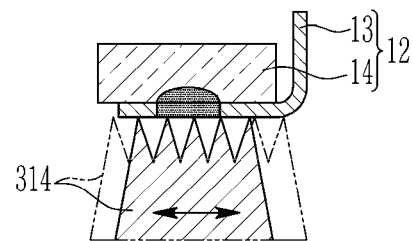
FIG. 6D is a view showing that the frictional reaction force measurement unit, included in the system for detecting a poor weld in a welded portion of a battery module according to an exemplary embodiment of the present disclosure, is in contact with the welded portion of the battery module to inspect the welded portion of the battery module.

Referring to FIGS. 5 to 6D, the battery module fixation unit 100 to which the battery module 10 to be inspected is fixed may be moved to the inspection position by the inspection position movement unit 200.

The welding inspection unit 300 may be positioned on the movable servo plate 330, and may be advanced toward the welded portion 12 of the battery module 10.

The welding inspection unit 300 may inspect the welded portion 12 of the battery module 10 as the servo plate 330 is moved to the inspection position along the rail 340.

The frictional reaction force measurement unit 310 of the welding inspection unit 300 may move the inspection assembly 312, the base 317 and the slight movement unit 314 by using the slight movement induction servo device 318 to a specific position for inspecting the welded portion 12 of the battery module 10, and may be induced to be slightly moved at the specific position.

The wedge formed on the end portion of the slight movement unit 314 may come into contact with the lead 13 of the welded portion 12 to be fixed by the friction force. The frictional reaction force and the amount of position change, detected during the slight movement of the welded portion 12 in the direction in which the battery cells are stacked, may depend on whether welding between the bus bar 14 and the lead 13 is good or poor (see FIGS. 6A and 6B).

Figure 7A:
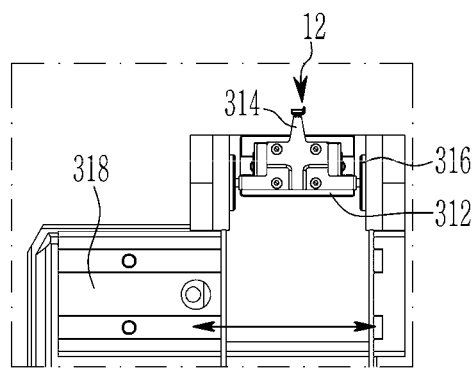
FIG. 7A is a view showing that the frictional repulsive force measurement unit, included in the system for detecting a poor weld in a welded portion of a battery module according to an exemplary embodiment of the present disclosure, inspects the welded portion of the battery module and determines whether the welded portion is poorly welded.
Figure 7B:
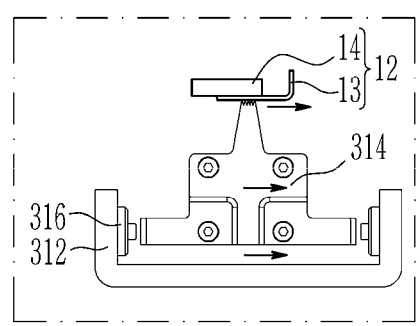
FIG. 7B is a view showing that the frictional repulsive force measurement unit, included in the system for detecting a poor weld in a welded portion of a battery module according to an exemplary embodiment of the present disclosure, inspects the welded portion of the battery module and determines whether the welded portion is poorly welded.
Figure 7C:
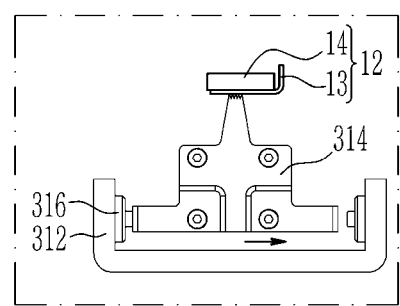
FIG. 7C is a view showing that the frictional repulsive force measurement unit, included in the system for detecting a poor weld in a welded portion of a battery module according to an exemplary embodiment of the present disclosure, inspects the welded portion of the battery module and determines whether the welded portion is poorly welded.

FIGS. 7A to 7C are views each showing that the frictional repulsive force measurement unit, included in the system for detecting a poor weld in a welded portion of a battery module according to an exemplary embodiment of the present disclosure, inspects the welded portion of the battery module and determines whether the welded portion is poorly welded.

Referring to FIGS. 7A to 7C, the slight movement unit 314 may be advanced toward the welded portion 12 to be inspected by the slight movement induction servo device 318, and the welding inspection unit 300 may be advanced by the servo plate 330 to come into contact with the specific lead 13 of the welded portion 12.

The slight movement induction servo device 318 may then induce the slight movement unit 314 to be slightly moved (see FIG. 7A).

In one embodiment, the slight movement induction servo device 318 may be operated for the slight movement unit 314 to be moved about 1 mm in one direction in which the battery cells of the battery module 10 are stacked and then maintained for about one second, and then moved about 1 mm in the other direction and then maintained for about one second.

When the lead 13 and the bus bar 14 are weakly welded or not welded to each other (see FIG. 7A), the lead 13 and the bus bar 14 may be separated from each other, thereby causing the slight movement unit 314 to be slightly moved together with the lead 13.

Here, the frictional reaction force measured by the frictional reaction force measurement load cell 316 may be smaller than the frictional reaction force generated by normal welding.

The control unit 400 may determine that the welded portion 12 of the battery module 10 is poorly welded when the frictional reaction force is less than about 40% of the tensile strength generated by the normal welding.

When the lead 13 and the bus bar 14 are normally welded to each other (see FIG. 7B), the slight movement unit 314 may be fixed to the lead 13. In this case, the frictional reaction force measured by the frictional reaction force measurement load cell 316 may thus be greater than the frictional reaction force generated when the lead 13 and the bus bar 14 are weakly welded or not welded to each other.

When the frictional reaction force is about 40% or more of the tensile strength generated by the normal welding, the control unit 400 may determine that the welded portion 12 of the battery module 10 is well welded.

Figure 8:
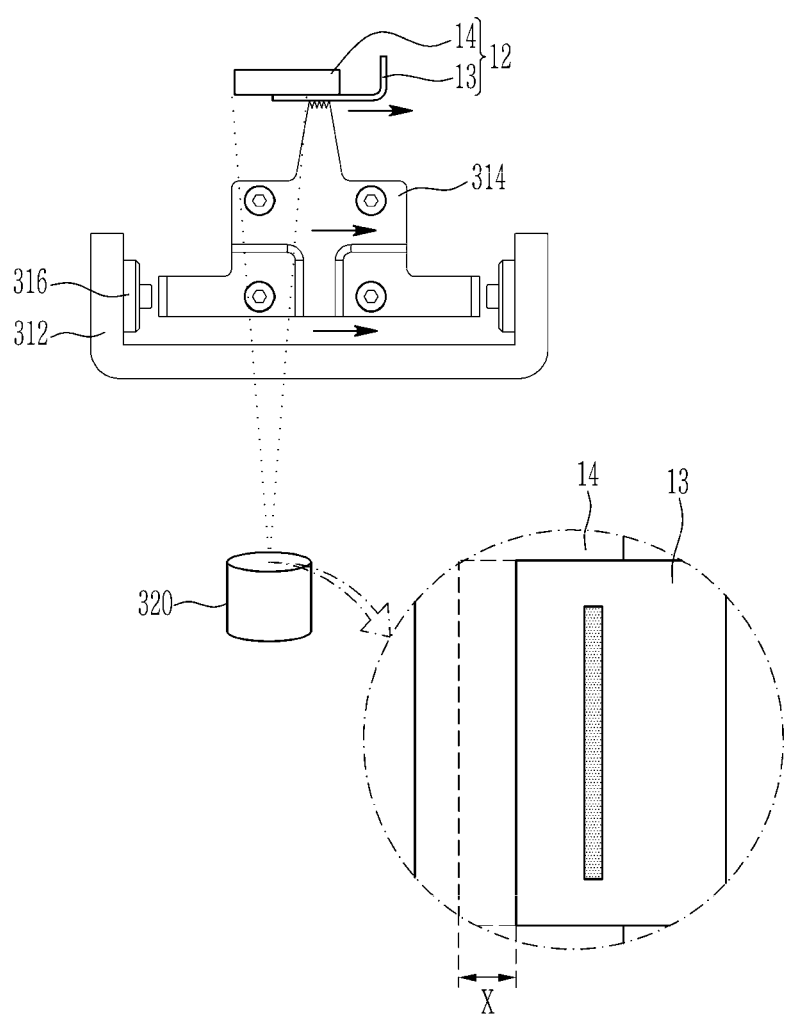
FIG. 8 is a view showing that a vision inspection camera, included in the system for detecting a poor weld in a welded portion of a battery module according to an exemplary embodiment of the present disclosure, inspects the welded portion of the battery module and determines whether the welded portion is poorly welded.
Figure 9:
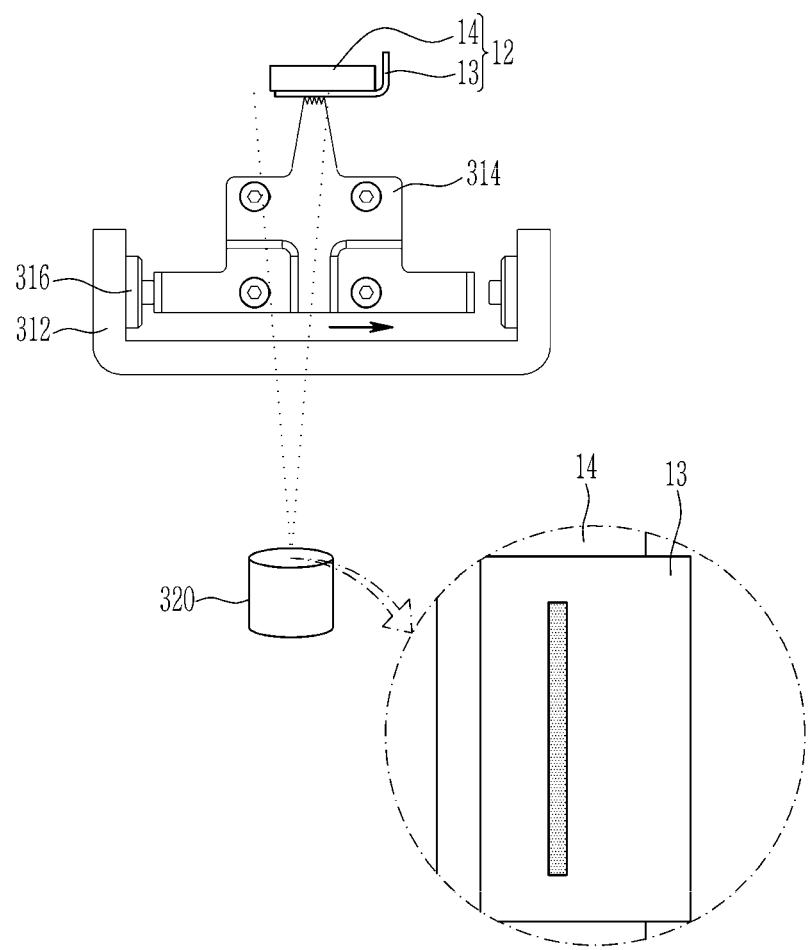
FIG. 9 is a view showing that a vision inspection camera, included in the system for detecting a poor weld in a welded portion of a battery module according to an exemplary embodiment of the present disclosure, inspects the welded portion of the battery module and determines whether the welded portion is poorly welded.

FIGS. 8 and 9 are views each showing that a vision inspection camera, included in the system for detecting a poor weld in a welded portion of a battery module according to an exemplary embodiment of the present disclosure, inspects the welded portion of the battery module and determines whether the welded portion is poorly welded.

Referring to FIG. 8, when the lead 13 and the bus bar 14 are weakly welded or not welded to each other, the lead 13 and the bus bar 14 may be separated from each other, thereby causing the slight movement unit 314 to be slightly moved together with the lead 13.

Here, the vision inspection camera 320 may detect an amount X of change generated in a position of the lead 13 of the battery module 10. The control unit 400 may determine that the welded portion 12 of the battery module 10 is poorly welded when the amount X of change in the position of the lead 13 is about 10% or more of an amount of the induced slight movement of the battery module 10 in the direction in which the battery cells are stacked.

The control unit may determine that the welded portion of the battery module 10 is poorly welded when the amount of change in the position of the lead 13 of the battery module 10, detected by the vision inspection camera 320, is about 0.1 mm or more in the direction in which the battery cells of the battery module 10 are stacked in a case where the slight movement unit 314 is moved by the slight movement induction servo device 318 about 1 mm in one direction in which the battery cells of the battery module 10 are stacked and then moved about 1 mm in the other direction.

As shown in FIG. 9, the amount of change in the position of the lead 13 of the battery module 10, detected by the vision inspection camera 320, may be less than about 0.1 mm or zero in the direction in which the battery cells of the battery module 10 are stacked. This case may indicate that the lead 13 and the bus bar 14 are not separated from each other. The control unit 400 may thus determine that the welded portion 12 is well welded.

Figure 10:
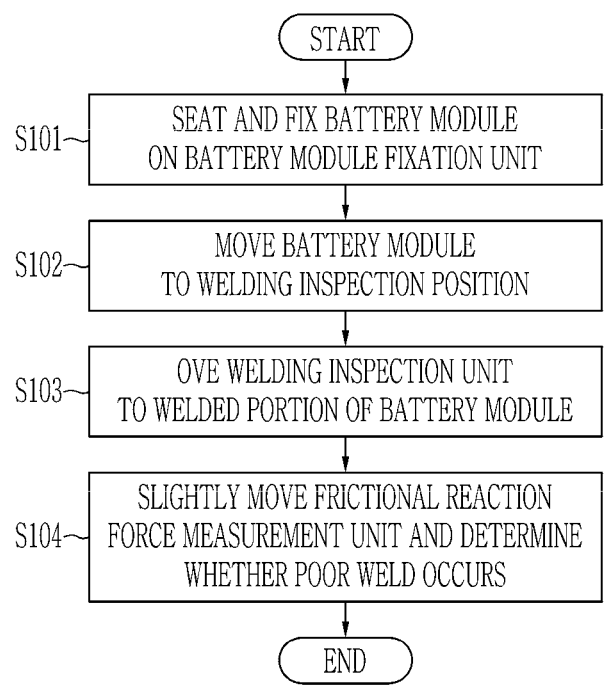
FIG. 10 is a flowchart showing a method of detecting a poor weld in a welded portion of a battery module according to another exemplary embodiment of the present disclosure.

FIG. 10 is a flowchart showing a method of detecting a poor weld in a welded portion of a battery module according to another exemplary embodiment of the present disclosure.

Referring to FIG. 10, the method of detecting a poor weld in a welded portion of a battery module according to another exemplary embodiment of the present disclosure may be the method of detecting a poor weld in a welded portion of a battery module, in which the method uses the system for detecting a poor weld in a welded portion of a battery module, described with reference to FIGS. 1 to 9. First, the battery module may be seated and fixed on a battery module fixation unit (S101).

The battery module fixed on the battery module fixation unit may then be moved to a position where the welded portion of the battery module faces a welding inspection unit (S102).

The welding inspection unit may then be moved toward the welded portion of the battery module for a frictional reaction force measurement unit to come into contact with the welded portion of the battery module (S103), and it may be determined whether the welded portion of the battery module is poorly welded through the welding inspection unit, by a control unit (S104).

As described above, the determining of whether the welded portion of the battery module is poorly welded (S104) may be made by slightly moving a frictional reaction force measurement unit 310 to detect a frictional reaction force generated by an induced slight movement of the battery module, and based on an amount of change in a position of a lead of the battery module, detected by a vision inspection camera.

The control unit may determine that the welded portion of a battery module 10 is poorly welded when the frictional reaction force is less than about 40% of tensile strength generated by normal welding. The control unit may also determine that the welded portion of the battery module is poorly welded when the amount of change in the position of the lead of the battery module is about 10% or more of an amount of the induced slight movement of the battery module in the direction in which the battery cells are stacked.

As set forth above, according to the present disclosure, it is possible to prevent the human error and the inspection omission by performing the automated welding inspection on the welded portion of the battery module, thereby reducing the labor cost.

In addition, according to the present disclosure, it is possible to prevent any damage to the welded portion and adhesion of a foreign material to a flip stick, which may occur when performing the inspection by using the conventional flip stick.

In addition, according to the present disclosure, it is possible to improve welding quality by detecting the poor weld such as non-welding or weak welding, by performing the vision inspection on the shape of the welded bead and by detecting the slight movement of the welded portion of the battery module.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. A system for detecting a poor weld in a welded portion of a battery module, which is to inspect a welded state of the battery module made by assembling a plurality of battery cells to each other, the system comprising:
   a battery module fixation unit fixing the battery module to be inspected;
   an inspection position movement unit moving the battery module fixation unit to a welding inspection position;
   a welding inspection unit including a frictional reaction force measurement unit inducing a movement of the welded portion of the battery module and measuring a frictional reaction force generated thereby, and a vision inspection camera detecting an amount of change in a position of the welded portion of the battery module; and a control unit determining whether the welded portion of the battery module is poorly welded based on the frictional reaction force and the amount of position change, measured by the welding inspection unit.

2. The system of claim 1, wherein
the welding inspection unit is positioned on a movable servo plate, and
the servo plate is coupled to a rail to be advanced and retreated toward the welded portion of the battery module moved to the inspection position.

3. The system of claim 1, wherein
the frictional reaction force measurement unit includes:
a base;
a movement unit disposed on the base, and moved by coming into contact with a lead of the welded portion of the battery module;
a frictional reaction force measurement load cell supporting both sides of the movement unit, and measuring the frictional reaction force induced by the movement of the movement unit; and
a movement induction servo device supporting the base and inducing the movement unit to be slightly moved at a specific position of the welded portion of the battery module.

4. The system of claim 3, wherein
the frictional reaction force measurement load cell and the vision inspection camera respectively transmit a signal of the frictional reaction force and a signal of the amount of position change to the control unit through a signal transmission wire.

5. The system of claim 3, wherein
a portion of the movement unit, in contact with the welded portion of the battery module, has a wedge and a protrusion to generate a friction force between the portion itself and a surface of the lead of the welded portion of the battery module.

6. The system of claim 3, wherein
the movement unit is disposed on an inspection assembly supporting the base, and the inspection assembly is ball-bearing coupled to a rail positioned on the movement induction servo device.

7. The system of claim 3, wherein
the control unit determines that the welded portion of the battery module is poorly welded when an amount of change in a position of the lead, detected by the vision inspection camera, is 10% or more of an amount of the induced movement of the battery module in a direction in which the battery cells are stacked.

8. The system of claim 7, wherein
the movement induction servo device is operated for the movement unit to be moved about 1 mm in one direction of the battery module in which the battery cells are stacked and then maintained for about one second, and then moved about 1 mm in the other direction and then maintained for about one second.

9. The system of claim 8, wherein
the control unit determines that the welded portion of the battery module is poorly welded when the amount of change in the position of the lead of the battery module, detected by the vision inspection camera, is 0.1 mm or more in the direction in which the battery cells of the battery module are stacked.

10. The system of claim 3, wherein
the control unit determines that the welded portion of the battery module is poorly welded when the frictional reaction force measured by the frictional reaction force measurement load cell is less than 40% of tensile strength generated by normal welding.

11. A method of detecting a poor weld in a welded portion of a battery module, in which the method uses the system of claim 1 for detecting the poor weld in a welded portion of a battery module, which is to inspect a welded state of the battery module made by assembling a plurality of battery cells to each other, the method comprising:
seating and fixing the battery module on a battery module fixation unit;
moving the battery module fixed on the battery module fixation unit to a position where the welded portion of the battery module faces a welding inspection unit;
moving the welding inspection unit toward the welded portion of the battery module for a frictional reaction force measurement unit to come into contact with the welded portion of the battery module; and
determining whether the welded portion of the battery module is poorly welded through the welding inspection unit, by a control unit.

12. The method of claim 11, wherein
in the determining of whether the welded portion of the battery module is poorly welded, the frictional reaction force measurement unit is slightly moved to detect a frictional reaction force generated by an induced slight movement of the battery module.

13. The method of claim 12, wherein
the welded portion of the battery module is determined to be poorly welded when the frictional reaction force is less than 40% of tensile strength generated by normal welding.

14. The method of claim 11, wherein
the determining of whether the welded portion of the battery module is poorly welded is made based on an amount of change in a position of a lead of the battery module, detected by a vision inspection camera.

15. The method of claim 14, wherein
the welded portion of the battery module is determined to be poorly welded when the amount of change in the position of the lead of the battery module is 10% or more of an amount of the induced slight movement of the battery module in a direction in which the battery cells are stacked.

* * * * *